UNITED STATES PATENT OFFICE.

ROGER W. WALLACE, OF LONDON, ENGLAND.

IMPROVEMENT IN COMPOUNDS FOR CRUCIBLES, RETORTS, AND CHEMISTS' WARE.

Specification forming part of Letters Patent No. 196,061, dated October 9, 1877; application filed May 24, 1877.

*To all whom it may concern:*

Be it known that I, ROGER WILLIAM WALLACE, of London, England, manufacturing chemist, have invented new and useful Improved Compounds for the Manufacture of Vessels or Apparatus for Chemical, Metallurgical, or similar purposes, which compounds are fully described in the following specification.

The object of this invention is to supply a want which has been long felt in the chemical trade—that is to say, a substance capable of resisting the action of acids and other chemicals at high temperatures.

Instead of kaolin, which is at present used, I employ plumbago in the manufacture of porcelain for these purposes.

In the first instance, I mix ground plumbago in a solution of borax or other suitable flux, thereby forming a "slip." To this slip I add an equal quantity, by weight, or thereabout, of ground feldspar, ground Cornwall or China stone, or similar fusible mineral; and to this I also add German, Stourbridge, or other fire-clay, in quantities proportionate to the degree of plasticity required.

The vessels or apparatus formed of the compound consisting of the plumbago, the fire-clay, and feldspar, or equivalent material, may be baked in open or muffle kilns, or in seggars similar to those now used in porcelain-kilns. When these muffle-kilns or seggars are to be used, the borax may be omitted from the compound.

The temperature required is that necessary for baking ordinary china-ware, and the length of time occupied in the baking is regulated by the thickness of the coating required; and if I add sulphate of soda, ground glass, or other suitable flux, it is possible to bake the materials at a low temperature, which I consider advisable for making retorts and other vessels used for manufacturing chemical products, which are not subjected to very high temperatures.

In the manufacture of crucibles for melting metals, and for similar purposes, I substitute common silver sand or pure ground silica for the feldspar or China-stone, the other materials remaining the same.

In order to improve the texture of the material, the biscuit may be dipped into slip and then heated in a muffle-kiln. A glaze may also be produced by dipping the vessels, in the first instance, into slips made of feldspar, in combination with other fluxes, such as carbonate of baryta, red lead, and the like; but I do not consider this last method of proceeding so advantageous as that above described.

I claim as my invention—

The compound described, consisting of plumbago, borax, or other flux, ground feldspar, and fire-clay, prepared and compounded in about the proportions and for the purposes set forth.

ROGER WILLIAM WALLACE.

Witnesses:
 WM. ROBT. RAKE,
 A. H. WHITE.